US006892874B2

(12) United States Patent
Pietz

(10) Patent No.: US 6,892,874 B2
(45) Date of Patent: May 17, 2005

(54) METHOD AND DEVICE FOR REDUCING THE POLYGON EFFECT IN THE REVERSING AREA OF PEDESTRIAN CONVEYOR SYSTEM

(75) Inventor: Alexander Pietz, Berlin (DE)

(73) Assignee: Kone Corporation, Helsinki (FI)

( * ) Notice: Subject to any disclaimer, the term of this patent is extended or adjusted under 35 U.S.C. 154(b) by 22 days.

(21) Appl. No.: 10/693,825

(22) Filed: Oct. 27, 2003

(65) Prior Publication Data

US 2005/0016817 A1 Jan. 27, 2005

Related U.S. Application Data

(63) Continuation of application No. PCT/EP02/04499, filed on Apr. 24, 2002.

(30) Foreign Application Priority Data

Apr. 27, 2001 (DE) ........................................ 101 20 767

(51) Int. Cl.[7] ................................................ B65G 15/00
(52) U.S. Cl. ........................................ 198/322; 198/330
(58) Field of Search ................................ 198/322, 323, 198/330

(56) References Cited

U.S. PATENT DOCUMENTS

| | | | | |
|---|---|---|---|---|
| 4,082,173 | A | | 4/1978 | Simon-Kochloffel |
| 4,671,783 | A | | 6/1987 | Seymour |
| 5,060,779 | A | | 10/1991 | Landaeus |
| 5,217,103 | A | | 6/1993 | Umlauf |
| 5,452,789 | A | | 9/1995 | Wolpers et al. |
| 5,538,384 | A | | 7/1996 | Haldimann |
| 5,595,278 | A | | 1/1997 | Ostermeier et al. |
| 6,070,716 | A | | 6/2000 | Haldimann |
| 6,142,901 | A | | 11/2000 | Kölling |
| 6,193,056 | B1 | | 2/2001 | van Zijderveld et al. |
| 6,351,096 | B1 | * | 2/2002 | Jang ........................... 198/322 |
| 6,450,317 | B1 | | 9/2002 | Fargo et al. |
| 6,540,060 | B1 | * | 4/2003 | Fargo et al. ................ 198/330 |
| 6,626,279 | B2 | * | 9/2003 | Henkel et al. .............. 198/322 |
| 6,637,579 | B2 | | 10/2003 | Pietz |

FOREIGN PATENT DOCUMENTS

| | | |
|---|---|---|
| DE | 23 46 266 A | 3/1975 |
| DE | 100 20 787 A | 1/2001 |
| DE | 199 58 709 A | 6/2001 |
| GB | 224330 | 10/1991 |
| RU | 6387 | 4/1996 |
| SU | 872401 | 10/1981 |
| SU | 956381 | 9/1982 |

OTHER PUBLICATIONS

Klepzig FACHBENCHTE 79, 1971, h 8. 198–200; Motion Problems in Chain–Drivers with Big Links.

* cited by examiner

*Primary Examiner*—James R. Bidwell
(74) *Attorney, Agent, or Firm*—Venable LLP; Robert Kinberg

(57) ABSTRACT

A device and method for reducing the polygon effect that occurs during the course of the reversing of a chain in a pedestrian conveyor, escalator, or moving walkway. The device includes a reversing wheel, at least one gear indirectly or directly acting upon the reversing wheel, at least one power supply unit, an electric driving motor coupled to the at least one gear and the at least one power supply unit such that the driving motor can be driven with a non-constant speed, a function generator, a controlling apparatus coupled to the function generator, at least one position sensor for detecting a phase position of the reversing wheel and transmitting the phase position to the controlling apparatus. In such a device, the controlling apparatus transmits a synchronized set speed value to the power supply unit based on the phase position.

14 Claims, 2 Drawing Sheets

METHOD AND DEVICE FOR REDUCING THE POLYGON EFFECT IN THE REVERSING AREA OF PEDESTRIAN CONVEYOR SYSTEM

CROSS REFERENCE TO RELATED APPLICATIONS

This application is a continuation of International Application No. PCT/EP02/04499, filed on Apr. 24, 2002, designating the United States, and claiming priority to German Application No. 101 20 767.0 filed on Apr. 27, 2001.

BACKGROUND OF THE INVENTION

1. Field of the Invention

The invention relates to a method for reducing the polygon effect that occurs during the course of the reversing of a chain, which can be used for a pedestrian conveyor, in particular an escalator or moving walkway.

2. Related Art

German Patent Document DE-A 199 58 709 describes a method and a device for reducing the polygon effect in the reversing area of pedestrian conveyors.

The polygon effect is caused by the polygonal rest of the chain on the chain wheel. With increasing rotation angle, the effective radius of the chain wheel varies, whereby the velocity of the chain oscillates between a maximum and a minimum value. When engaging the chain wheel, the chain rolls and the teeth of the chain wheel have different velocities, which cause impacts. The revolution effect is caused by the angular momentum which is transmitted from the chain wheel onto the chain links and thus onto the steps or pallets. After the chain has run out of the chain wheel, this angular momentum is temporarily maintained due to the inertia of the system, which leads to the so-called curling of the chain. The angular momentum is reduced by friction in the chain respectively by impacts between chain and guiding if a chain guiding element is provided. In contrast to the modifications that have been known so far and which have been exclusively provided in the mechanical field, DE-A 199 58 709 presents a concept, which contains an electrical solution, namely a modification of the drive.

German Patent document DE-A 100 20 787 describes an operational controlling apparatus of an escalator, comprising a frequency converter for converting a three-phase alternating mains current into an alternating current having a variable voltage and a variable frequency, in order to control the operational speed of the escalator; a gear and a chain wheel for driving a tread plate using a rotation force, which is generated by an induction motor, and a current detector for detecting a current, which flows within the induction motor, a controlling apparatus for an escalator comprising: a speed detector for detecting the rotation speed of the induction motor; a position detector for detecting the rotation position of the chain wheel; and a controlling device, which controls the frequency converter by means of an output signal of the speed detector and the position detector for obtaining a current, which compensates the vibrational angular momentum, wherein the above current is added to a current output by a speed controlling apparatus; wherein an actual current detection value of the induction motor is subtracted from the resulting current value; and wherein a pulse duration modulation signal is generated accordingly.

OBJECTS OF THE INVENTION

It is an object of the invention to provide an improved method and device for the quiet running of a pedestrian conveyor, escalator, or walkway.

SUMMARY OF THE INVENTION

The above and other objects are achieved by a method for reducing the polygon effect that occurs during the course of the reversing of a chain, which can be used for a pedestrian conveyor, in particular an escalator or moving walkway, by superimposing a different rotational speed upon the rotational speed of the reversing wheel via the electric drive, which indirectly or directly acts upon said reversing wheel, and by realising a position dependent control of the speed, such that the speed variations, which are generated at the chain rope during the drive with essentially constant rotation frequency, are detected, wherein the compensation is obtained in that the reversing wheel is driven with irregular rotation frequency.

The above and other objects of the invention are also achieved by a device for reducing the polygon effect that occurs during the course of the reversing of a chain, which can be used for a pedestrian conveyor, in particular an escalator or moving walkway, at least comprising one electric driving motor, which is connected to at least one gear, if necessary, and which indirectly or directly acts upon the reversing wheel, wherein the driving motor is connected to at least one power supply unit, in particular a frequency converter, so that the driving motor can be driven with a non-constant speed, wherein at least one position sensor detects the phase position of the reversing wheel and transmits these values to a controlling apparatus, which is in active relation with a function generator, and the synchronized set speed value of which can be transmitted to the power supply unit, especially the frequency converter, which is connected to the driving motor.

BRIEF DESCRIPTION OF THE DRAWINGS

The subject of invention is represented by means of an exemplary embodiment in the drawing and described as follows. In the drawing.

DETAILED DESCRIPTION OF THE INVENTION

The invention realizes a position dependent control of the speed. The speed variations in the chain rope are essentially influenced by the number of teeth of the chain wheel (reversing wheel). Another factor is the geometry of the guiding, which influences the entry of the chain into the chain wheel. Based upon the fact that these speed variations can be calculated, the same ones can be consequently predetermined, so that no automatic control, which intervenes in the system, is required, but a concrete control is realized. The necessary function can be determined by calculation and, if necessary, by experiments, which then represents a firmly set value, and which only has to be synchronized with the angular position of the chain wheel during running operation. For this purpose, at least one position sensor is provided in the region of the chain wheel, which detects the phase position of the chain wheel and transmits the same one to a controlling apparatus, which cooperates with a function generator, which contains the mathematical function(s). The synchronized set speed value is transmitted via the controlling apparatus, to the power supply unit, especially the frequency converter.

The invention is especially useful, when the chain pitch is increased to approximately 200 mm (half step spacing) and, if necessary, to approximately 400 mm (complete step spacing), whereby one can clearly remain under the limit number of teeth of the chain wheels of usually Z=17, which has been necessary for the chain wheel systems according to the state of the art. This measure enables an important cost saving for escalators and moving walkways.

Figure 1:
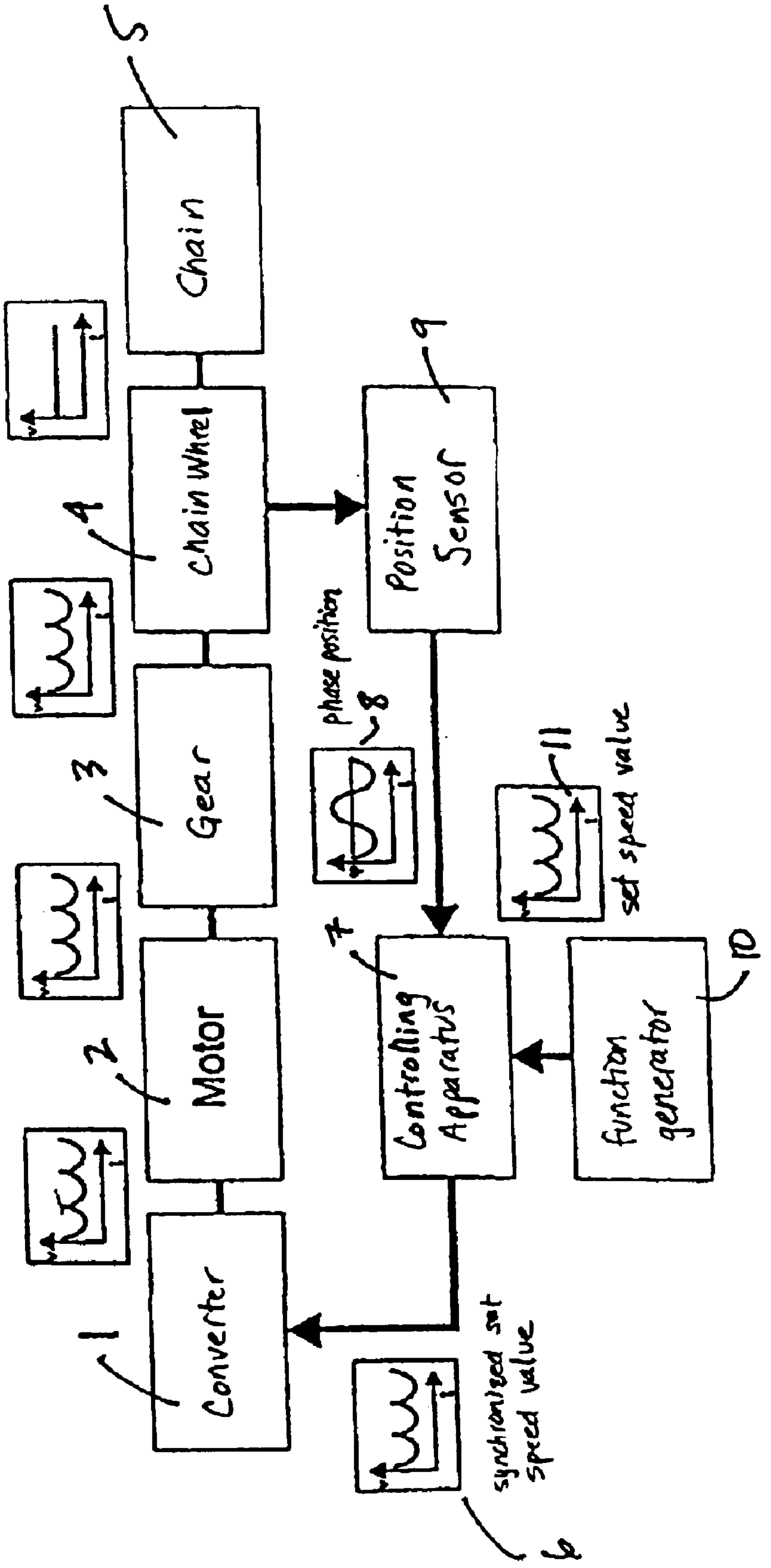
FIG. 1 is a schematic diagram of an exemplary embodiment of the system structure.

FIG. 1 is a schematic representation of the system showing how the polygon effect of a chain wheel system can be positively influenced with respect to the drive, such that the quiet running of an escalator or moving walkway (not shown) is improved. FIG. 1 shows, in the individual boxes, a chain 5, a chain wheel (reversing wheel) 4, a gear 3, a motor 2, as well as a frequency converter 1 coupled to each other as illustrated in FIG. 1. At the interfaces between chain 5 and chain wheel 4, chain wheel 4 and gear 3, gear 3 and motor 2 as well as motor 2 and converter 1, the respective speed values are represented with respect to time. The chain wheel 5 is associated with a position sensor 9, which detects the position of the respective reception caps (not shown), which are formed between two chain teeth (not shown), and thus determines the phase position. The values of the respective phase positions of the chain wheel 4 are transmitted to a downstream controlling apparatus 7, which is coupled to a function generator 10. The function generator 10 can include the mathematical function(s) of the chain upon entering the chain wheel 4 (set speed value 11), so that in the region of the controlling apparatus 7, only a comparison of the transmitted phase position 8 of the chain wheel 4 with the pre-determined set speed value 11 has to be carried out to produce a synchronized set speed value 6. The converter 1 is then supplied with the respectively correct speed value 6 such that a corresponding speed value can be superimposed on the chain wheel via motor 2 and gear 3. In contrast to the state of the art, a position dependent control of the speed is thus realized, whereby the quiet running of the pedestrian conveyor (not shown) can be significantly increased. As already mentioned, chains can be realized having a pitch of up to 200 mm or even up to 400 mm, when the limit number of teeth of the chain wheel has been correspondingly reduced to less than z=17.

Figure 2:
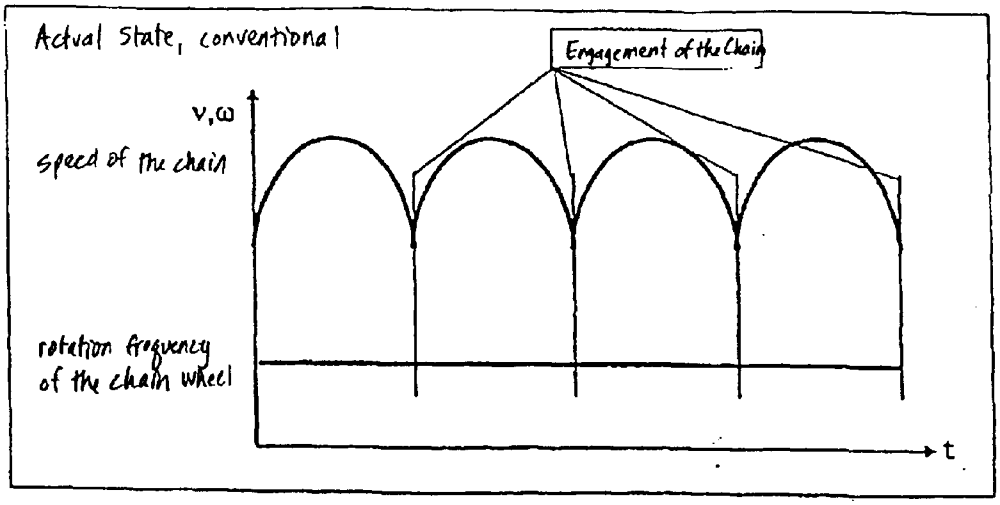
FIG. 2 is a comparative representation of a conventional drive.
Figure 3:
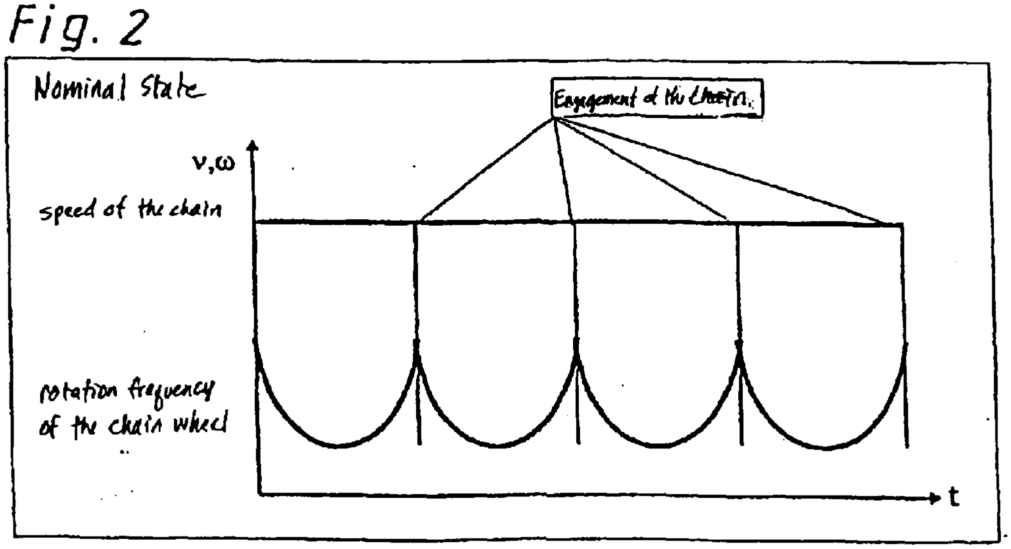
FIG. 3 is a comparative representation of a nominal drive.
Figure 4:
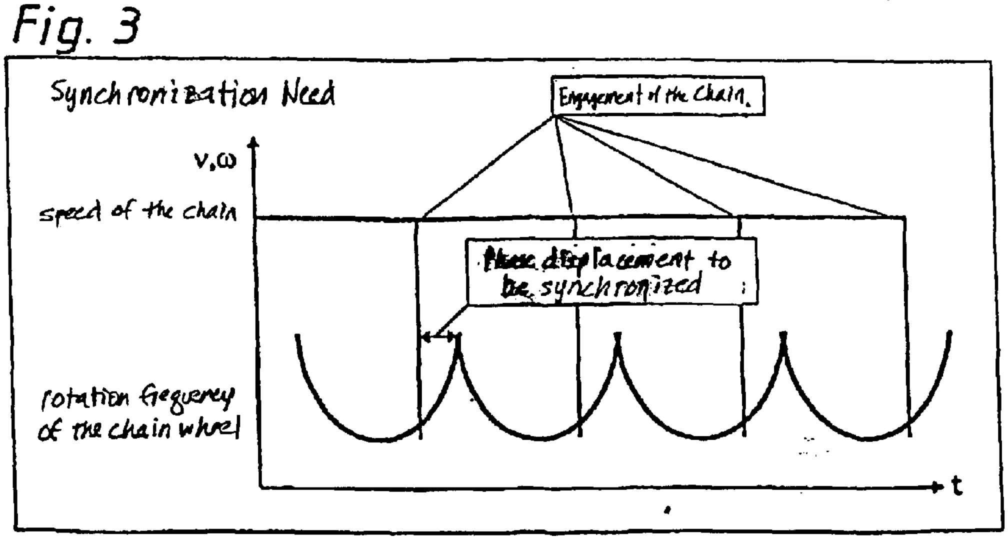
FIG. 4 is a comparative representation of a needed synchronization drive.

FIGS. 2 through 4 show comparative examples of a conventional drive (FIG. 2), on the one hand, and the nominal state with correct phase position (FIG. 3) as well as the synchronization need (FIG. 4).

The speed of the chain as well as the rotation frequency of the chain wheel are illustrated with respect to time. In the state of the art, the rotation frequency of the chain wheel is constant, whereas the speed of the chain is provided as curved function, and the respective engagement of the chain in the chain wheel, which rotates with constant rotation frequency, has to be considered as non-constant.

FIG. 3 shows one way to realize the invention, i.e., to keep the speed of the chain constant, whereas the rotation frequency of the chain wheel, seen over time, is a curved function, However, one could also think of other possibilities.

The synchronization need is represented in FIG. 4, wherein the phase displacement to be synchronized is deposited as a mathematical function in the function generator 10 and transmitted to the controlling apparatus 7. The controlling apparatus 7 only determines the divergence of the phase position 8 of the chain wheel 4, which is provided by the position sensor 9, with respect to the set speed value 11, wherein the phase displacement to be synchronized can then be transmitted to the converter 1 and thus to the chain wheel 4 via motor 2 and gear 3.

The embodiments illustrated and discussed in this specification are intended only to teach those skilled in the art the best way known to the inventors to make and use the invention. Nothing in this specification should be considered as limiting the scope of the present invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. A method for reducing a polygon effect that occurs during a course of a reversing of a chain of a pedestrian conveyor, the pedestrian conveyor moving at a speed and having a reversing wheel and an electric drive indirectly or directly acting on the reversing wheel, the method comprising the steps of:

driving the reversing wheel with an essentially constant rotational frequency;

detecting variations in the speed of the chain during the driving step; and compensating for the variations in the speed of the chain by driving the reversing wheel with irregular rotation frequency such that a position dependent control of the speed is realized by superimposing a different rotational speed upon the rotational speed of the reversing wheel via the electric drive.

2. The method according to claim 1, wherein the method further comprises:

determining a mathematical function representing a set value and which is synchronized with the angular position of the reversing wheel while the pedestrian conveyor is operating.

3. The method according to claim 1, wherein the conveyor comprises spaced steps or pallets, the method further including using a chain having a chain pitch corresponding to one half of a step or pallet spacing.

4. The method according to claim 3, including using a chain having a pitch of approximately 200 mm.

5. The method according to claim 1, wherein the conveyor comprises spaced steps or pallets, the method further including using a chain having a chain pitch corresponding to a complete step or pallet.

6. The method according to claim 5, including using a chain having a pitch of approximately 400 mm.

7. A device for reducing the polygon effect that occurs during the course of the reversing of a chain in a pedestrian conveyor, comprising:

a reversing wheel;

at least one power supply unit;

an electric driving motor indirectly or directly acting upon the reversing wheel and coupled to the at least one gear and the at least one power supply unit such that the driving motor can be driven with a non-constant speed;

a function generator;

a controlling apparatus coupled to the function generator; and at least one position sensor for detecting a phase position of the reversing wheel and transmitting the phase position to the controlling apparatus, wherein the controlling apparatus transmits a synchronized set speed value to the power supply unit based on the phase position.

8. The device according to claim 7, wherein the function generator includes at least one mathematical function of the chain, the at least one mathematical function corresponding to entry of the chain in the reversing wheel.

9. The device according to claim 7, wherein the chain has a pitch corresponding to one half of a step or pallet spacing in the pedestrian conveyor.

10. The device according to claim 9, wherein the pitch is approximately 200 mm.

11. The device according to claim 7, wherein the chain has a pitch corresponding to a complete step or pallet spacing in the pedestrian conveyor.

12. The device according to claim 11, wherein the pitch is approximately 400 mm.

13. The device according to claim 7, wherein the power supply unit is a frequency converter.

14. The device according to claim 7, further comprising:

at least one gear coupled between the electric driving motor and the reversing wheel.

* * * * *